Jan. 10, 1939.   C. P. FREDERICKSON   2,143,346
PASTEURIZING SYSTEM
Filed Jan. 17, 1938

INVENTOR
Clarence P. Frederickson
BY
ATTORNEY

Patented Jan. 10, 1939

2,143,346

UNITED STATES PATENT OFFICE 2,143,346

PASTEURIZING SYSTEM

Clarence P. Frederickson, Waterbury, Conn., assignor to The Trumbull Electric Manufacturing Company, Plainville, Conn., a corporation of Connecticut Application January 17, 1938, Serial No. 185,319

15 Claims. (Cl. 219—40)

My invention relates especially to systems for treating milk electrically such, for instance, as set forth in the Getchell Patent 2,052,396 of August 25, 1936.

The main object is to prevent improperly heated milk from passing through the system and mingling with the properly treated milk.

It is highly desirable of course that such a system shall operate automatically to a maximum degree and that the temperature of the treated milk during and after treatment shall only vary slightly from predetermined limits in the various stages.

I have accordingly provided means for automatically draining milk from the system when the normal flow is checked or when the temperature of the treated milk fails to reach a predetermined point.

This automatic division of the partially heated milk may be accomplished by a pressure controlled discharge valve or by an electrically controlled valve and in either case the valve may be automatically returned to its normal operating position upon resumption of normal conditions.

Figure 1:
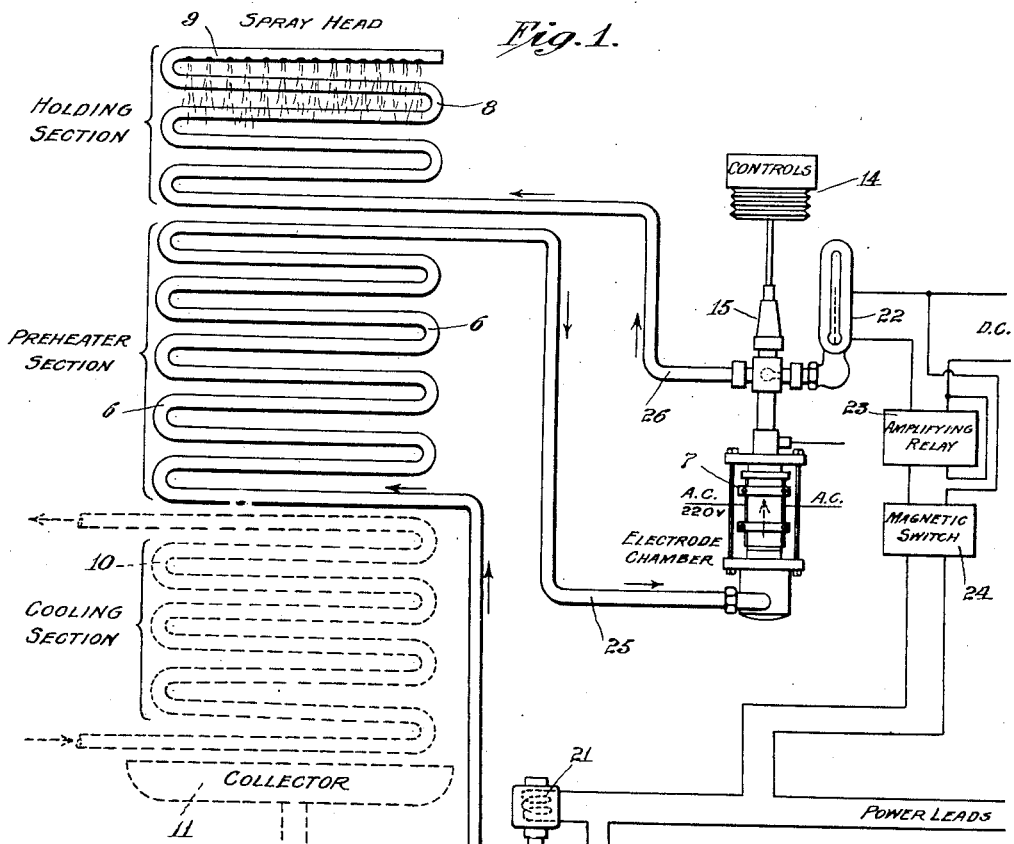
Fig. 1 is a diagrammatic view of parts of one form of apparatus or system involving my invention utilizing electrical means for actuating a discharge valve.
Figure 2:
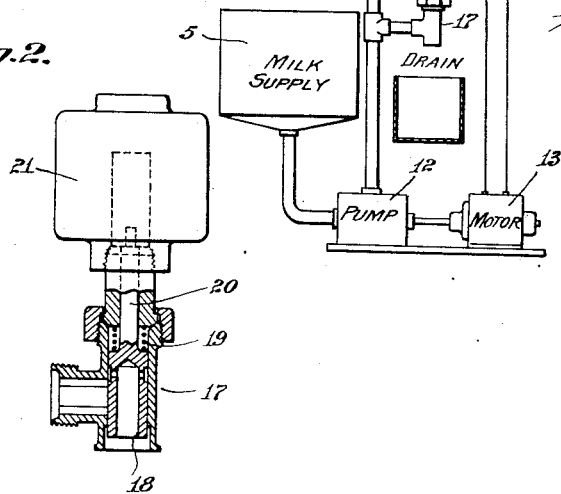
Fig. 2 is a detail side and sectional view of the flow-back or discharge valve.

The milk from the supply reservoir 5 passes through a circulating system including the preheater coil 6, the heating or electrode chamber 7 and the holding coil 8 and is discharged from the spray head 9.

The hot milk then flows over the coils 6 and the cooling coils 10 and is collected in the trough 11 from which it is led to the bottling station (not shown).

The milk is preferably forced through the system by a positive pump 12 driven by a self starting motor 13.

Suitable voltage is applied to the opposite walls of the electrode chamber in the usual manner and regulated by suitable controls 14 connected to the temperature responsive bulb 15 at the exit from the electrode chamber.

In order to properly pasteurize the milk it is kept at about 162° F. for approximately fifteen seconds before cooling. This holding action may be conveniently effected by arranging a coil 8 beyond the outlet from the electrode chamber in a position where it will be covered by the film of hot milk discharged from the spray head 9. This serves to utilize the hot milk to keep the temperature uniform until the descending hot milk descends to the coils 6 of the incoming cold milk so as to warm up this cold milk while cooling the hot milk. Usually it is desirable to continue the cooling of the treated milk by its passage over the colder coil 10.

In case of failure of the power supply or stoppage of the pump the milk would either be insufficiently heated or overheated. In either case it is highly undesirable for the milk in the system to be mixed with the properly treated milk.

Similarly it is improper to mix milk which has failed to reach the minimum of say 160° F. with the properly pasteurized milk. If overheated, the taste and other characteristics are badly affected. If the milk is underheated it is unsafe to use. In no case should the milk be allowed to stand in the circulating pipes or in the electrode chamber.

I therefore provide means for draining a whole or part of the system in case of failure of the power supply or in case the milk is improperly heated. An outlet member 17 is connected to the pipe line at a suitable point below the heater. This is normally closed by the valve 18 when the system is running properly. A spring 19 tends to open the valve and allow the milk above it to drain out. This valve however is normally held closed against the spring pressure by means for instance of a solenoid magnet whose core 20 is connected to the valve 18 and whose coil 21 is in the power circuit. When the circuit is opened the magnet is deenergized and the spring opens the valve so as to clear the system and prevent the milk above the valve from returning to the milk supply.

I also provide a temperature controlled switch 22 which is connected in the conduit just above the electrode chamber and which through an amplifying relay 23 controls a magnetic switch 24. When the temperature of the treated milk fails to reach the proper degree this contact making thermometer causes the switch 24 to open the circuit through the magnet coil 21 and thus stop the pump 12, open the valve 18 and drain the milk as above described.

If the coil 21 remains deenergized sufficiently long the entire system above the valve 18 will be drained. If desired a similar drain valve may be inserted at 25 just below the electrode chamber and/or at 26 above the electrode chamber.

It should also be understood that other controls may be provided as set forth in the Getchell Patent 2,052,396.

Figure 3:
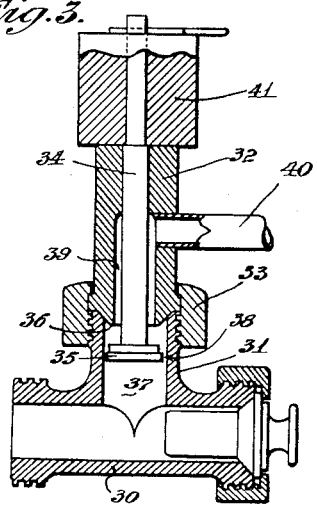
Fig. 3 is a sectional view of a pressure and gravity actuated discharge valve.

The form of valve shown in Fig. 3 may be used at one or more of the positions indicated in Fig. 1 below a part of the conduit which contains heated milk which it is desired to discharge from the system so as to avoid mingling it with the properly treated milk.

The T-shaped connection 30 is secured to the conduit in the same way that 17 is secured in Fig. 1. The vertical part 31 supports a valve casing 32 which is detachably secured in position by the nut 33. In this casing is guided the stem 34 of the valve 35. The casing has a seat 36 for the valve. The valve 35 is slightly smaller in diameter than the diameter of the passage 37 so as to leave a small flow passage 38 around the edge and there is a passage 39 around the stem leading to the outlet 40. The area of the upper face of the valve 35 is considerably smaller than the area of the lower face. As a result of a proper proportioning of the parts just described, the valve 35 is normally held closed by the pressure of the milk in the passage 37 due to the operation of the pump 12.

If the pressure drops due to stoppage of the pump the weight of the valve and its stem and additional weight 41 if necessary will cause the valve to drop and open the discharge passage so as to allow the heated milk in the conduit above it to run out. The weight of the valve and attached parts should be sufficient to hold the valve open against the back flow of liquid due to gravity.

When the pump is started again, the pressure in the system acts against the bottom side of the valve head and automatically closes the valve. This takes place both because the top of the valve head has a smaller surface than the bottom of the valve head and because the clearance (between the valve head and the part of the flow passage in the T in which the head moves) is so small that pressure is built up below the valve head faster than it can be built up above the valve head.

The weight of the valve and attached parts should of course be calculated to cause the valve to open and close at the pressures likely to occur in the system.

The parts of the discharge valve are made as far as possible of standard sanitary fittings and so that they can be readily taken apart and easily cleaned and reassembled.

I claim:

1. In a milk pasteurizing system, a supply reservoir and a circulating conduit connected thereto and including an electrode chamber for passing an electric current through the milk to heat it, a regenerative pre-heater and means controlled by the temperature of the heated milk for stopping the forward flow of milk through the electrode chamber and preheater when the milk fails to reach a predetermined temperature and discharging insufficiently heated milk from the system.

2. In a milk pasteurizing system, a supply reservoir and a circulating conduit connected thereto, means for forcing milk through the conduit, means for passing an electric current through the milk to heat it, and means controlled by the temperature of the hetaed milk for stopping the forward flow of milk through the conduit when the milk fails to reach a predetermined temperature and discharging insufficiently heated milk from the system.

3. In a milk pasteurizing system, a supply reservoir and a circulating conduit connected thereto and including a pump for forcing the milk through the conduit, electrodes for passing an electric current through the milk to heat it, means for heating the incoming milk by the electrically heated milk and means controlled by the condition of the milk above the pump for stopping the forward flow of milk through the conduit when the milk fails to reach a predetermined temperature as it leaves the electrodes and discharging insufficiently heated milk from the system.

4. A milk pasteurizing system including a supply reservoir and a circulating conduit connected thereto and having a pump for forcing the milk through the conduit, an electrod chamber for heating the milk, means for stopping the forward flow of milk through the conduit when the milk fails to reach a predetermined temperature and means including a discharge valve between the pump and the electrode chamber for draining insufficiently heated milk from the system.

5. In a milk pasteurizing system, a supply reservoir and a circulating conduit connected thereto and including an electrically driven pump for forcing the milk through the conduit, means for passing an electric current through the milk to heat it, and means controlled by the temperature of the heated milk for stopping the forward flow of milk through the conduit when the milk fails to reach a predetermined temperature and discharging insufficiently heated milk from the system.

6. In a milk pasteurizing system, a supply reservoir and a circulating conduit connected thereto, means for passing an electric current through the milk to heat it, and means controlled by the temperature of the electrically heated milk for discharging improperly heated milk from the system and preventing it from mingling with the fresh milk.

7. In a milk pasteurizing system, a supply reservoir and a circulating conduit connected thereto and including an electrically driven pump for forcing the milk through the conduit, means for passing an electric current through the milk to heat it, and means controlled by the temperature of the heated milk for discharging improperly heated milk from the system and preventing it from mingling with the fresh milk.

8. In a milk pasteurizing system, a supply reservoir and a circulating conduit connected thereto and including an electrically driven pump for forcing the milk through the conduit, an electrode chamber for passing an electric current through the milk to heat it, and means controlled by the temperature of the heated milk for draining the improperly heated milk from the electrode chamber and preventing it from mingling with the fresh milk.

9. In a milk pasteurizing system, a supply reservoir and a circulating conduit connected thereto and including an electrically driven pump for forcing the milk through the conduit, means for passing an electric current through the milk to heat it, a regenerative preheater for the incoming milk deriving its heat from the electrically heated milk, and means controlled by the temperature of the heated milk for discharging improperly heated milk from the preheater and preventing it from mingling with the fresh milk.

10. In a milk pasteurizing system, a supply reservoir and an circulating conduit connected thereto and including an electrically driven positive pump for forcing the milk through the conduit, means for passing an electric current through the milk to heat it, means for heating the incoming milk by the electrically heated milk and means controlled by the temperature of the heated milk for discharging improperly heated milk from the system and preventing it from mingling with the fresh milk.

11. In a pasteurizing system, a circulating conduit including a motor driven pump, an electrode chamber for heating the liquid, a spray head, a preheater coil heated by the discharging hot liquid and means including valve means attached to the conduit between the pump and the electrode chamber for automatically draining heated liquid from the system in case of failure of the supply of current to the apparatus.

12. In a milk pasteurizing system, a circulating conduit including a positive action pump for forcing milk through the conduit, an electrode chamber for heating the milk as it passes through the chamber, a normally closed drain valve connected to the conduit between the electrode chamber and the pump and means for opening the valve to discharge heated milk from the conduit when the pump stops.

13. In a pasteurizing system, a circulating conduit including a heater section, a preheater section, and a pump for forcing liquid through the conduit, and a discharge valve beneath at least one of the heater sections and means for opening said discharge valve automatically when the liquid stops moving forwardly through said conduit.

14. In a milk treating system, a milk circulating conduit including heating means and means for forcing the milk through the conduit and the heating means, and a rejecting valve structure connected to the conduit below the heating means including a control valve normally held closed by the pressure of the milk and adapted to open automatically upon failure of pressure.

15. In a pasteurizing system, a circulating conduit for liquid including, a liquid supply, an electrode chamber for heating the liquid, and a holding coil connected to the outlet from the electrode chamber and terminating in a spray head discharging heated liquid over the holding coil, a pump for forcing liquid through the conduit and means controlled by the condition of the liquid for discharging liquid from the electrode chamber and preventing it from mingling with the untreated liquid when the pump stops.

CLARENCE P. FREDERICKSON.